(12) United States Patent
Onoda et al.

(10) Patent No.: US 7,684,700 B2
(45) Date of Patent: Mar. 23, 2010

(54) LOSS-OF-SIGNAL DETECTING DEVICE

(75) Inventors: Yoshihiro Onoda, Kawasaki (JP);
Takashi Sekiguchi, Kawasaki (JP);
Takao Sumiya, Kawasaki (JP);
Yoshihiro Kaneda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 70 days.

(21) Appl. No.: 11/889,051

(22) Filed: Aug. 8, 2007

(65) Prior Publication Data

US 2007/0280684 A1   Dec. 6, 2007

Related U.S. Application Data

(63) Continuation of application No. PCT/JP2005/001850, filed on Feb. 8, 2005.

(51) Int. Cl.
*H04B 10/08* (2006.01)
*H04B 10/00* (2006.01)

(52) U.S. Cl. ................ 398/38; 398/33; 398/22; 398/25; 398/155

(58) Field of Classification Search ........... 398/151, 398/154, 155, 158, 38, 9, 22, 23, 24, 25, 398/27, 33
See application file for complete search history.

(56) References Cited

U.S. PATENT DOCUMENTS

| 5,504,611 | A  | * | 4/1996 | Carbone et al. | ........ | 398/37 |
| 7,099,382 | B2 | * | 8/2006 | Aronson et al. | ........ | 375/219 |
| 7,349,450 | B2 | * | 3/2008 | Ghiasi et al. | ........ | 370/543 |
| 2002/0122223 | A1 | * | 9/2002 | Gallant et al. | ........ | 359/110 |
| 2004/0052520 | A1 | * | 3/2004 | Halgren et al. | ........ | 398/5 |
| 2005/0111845 | A1 | * | 5/2005 | Nelson et al. | ........ | 398/138 |

FOREIGN PATENT DOCUMENTS

| JP | 2002-44035 | 2/2002 |
| JP | 2002-141874 | 5/2002 |
| JP | 2003-60736 | 2/2003 |

OTHER PUBLICATIONS

International Search Report issued Mar. 10, 2005 in corresponding PCT Application No. PCT/JP2005/1850 (2 pp).

* cited by examiner

*Primary Examiner*—M. R. Sedighian

(57) ABSTRACT

The invention relates to an optical transmitting device. Particularly, the invention provides a loss-of-signal detecting device that detects a loss of an optical signal received by a terminal station or a relay station, in the order of an SD and an SF. The loss-of-signal detecting device includes: an optical input unit that outputs received-optical-power reduction information and a LOS alarm based on a measuring of received optical power of an optical input signal; a synchronizing unit that extracts a synchronous clock contained in the optical input signal, and outputs an LOL alarm when the clock is asynchronous; and a loss-of-signal detecting unit that determines the presence or absence of the received-optical-power reduction information, sets the LOS alarm valid based on the output of the LOL alarm when the received-optical-power reduction information is present, and immediately sets the LOS alarm valid when the received-optical-power reduction information is absent, thereby detecting a loss of signal based on a valid LOS alarm.

8 Claims, 10 Drawing Sheets

ALARM DETECTS WHEN '1'

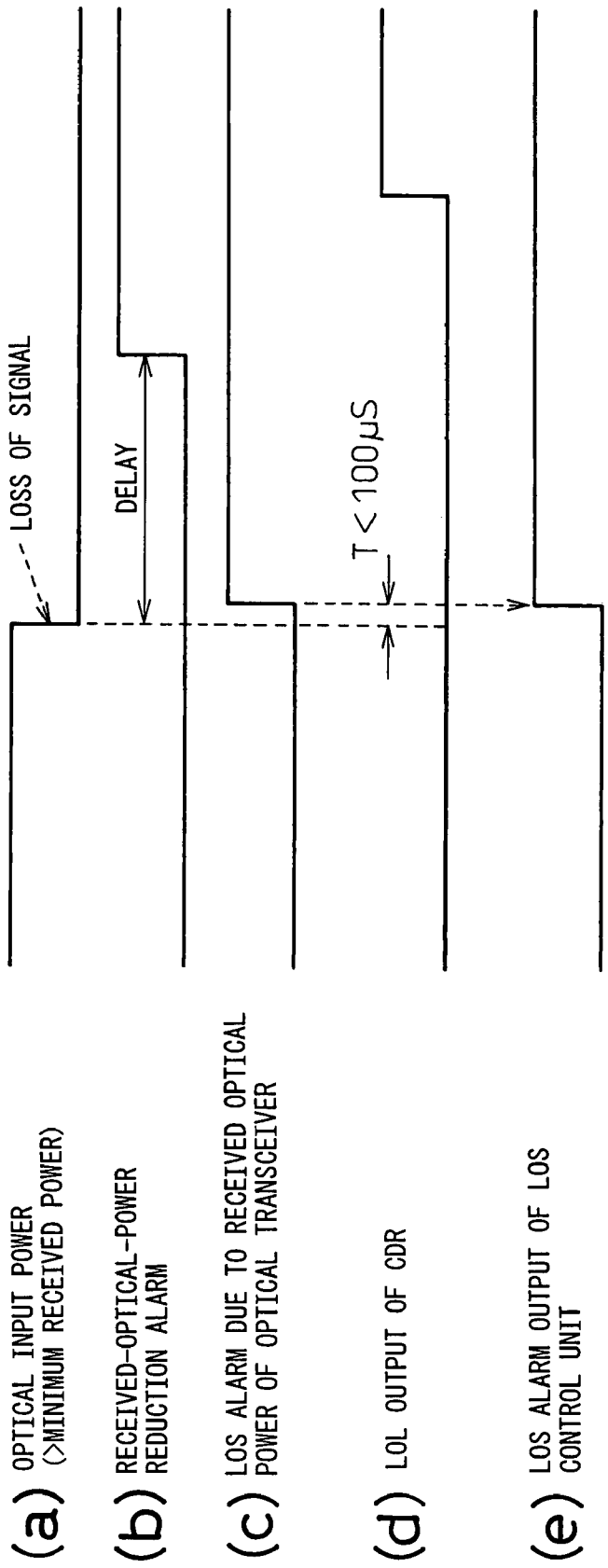

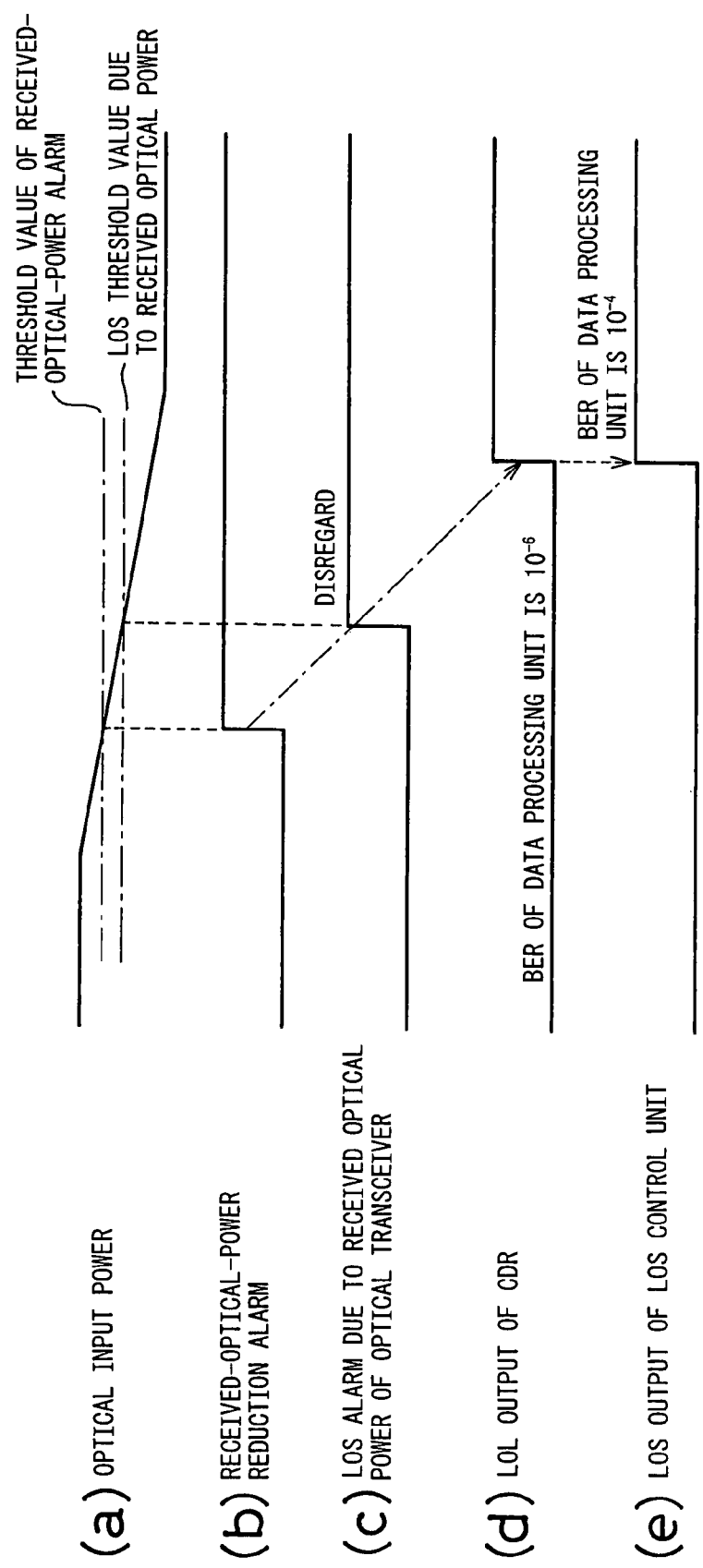

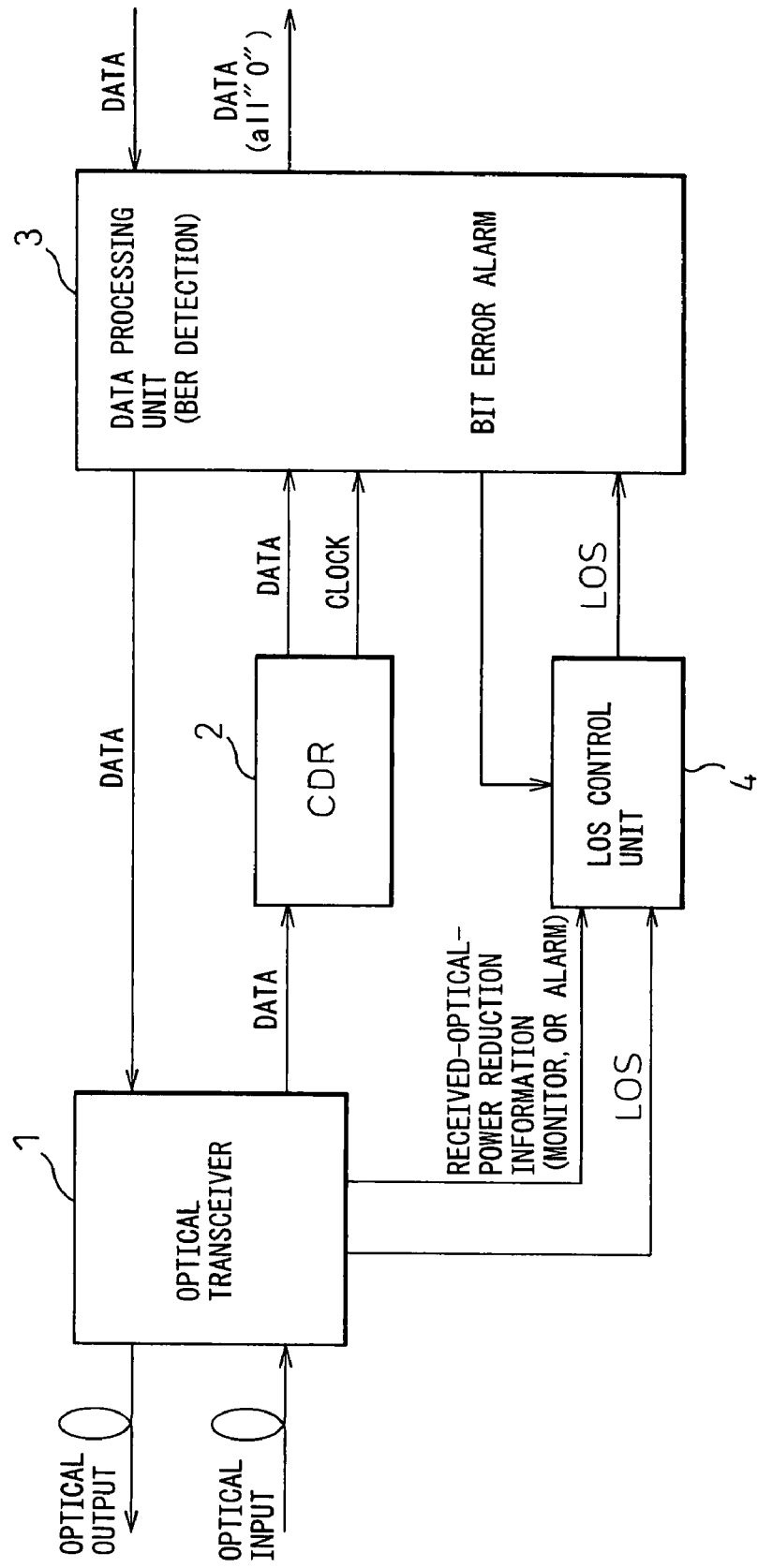

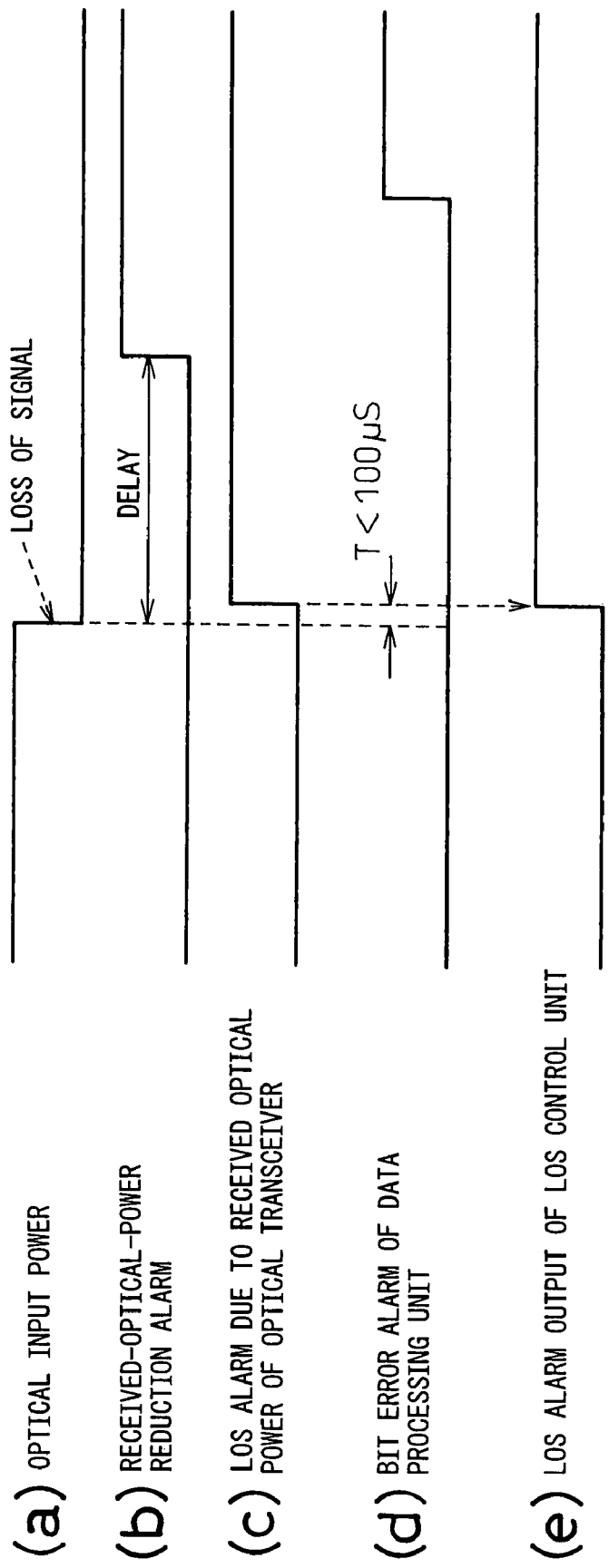

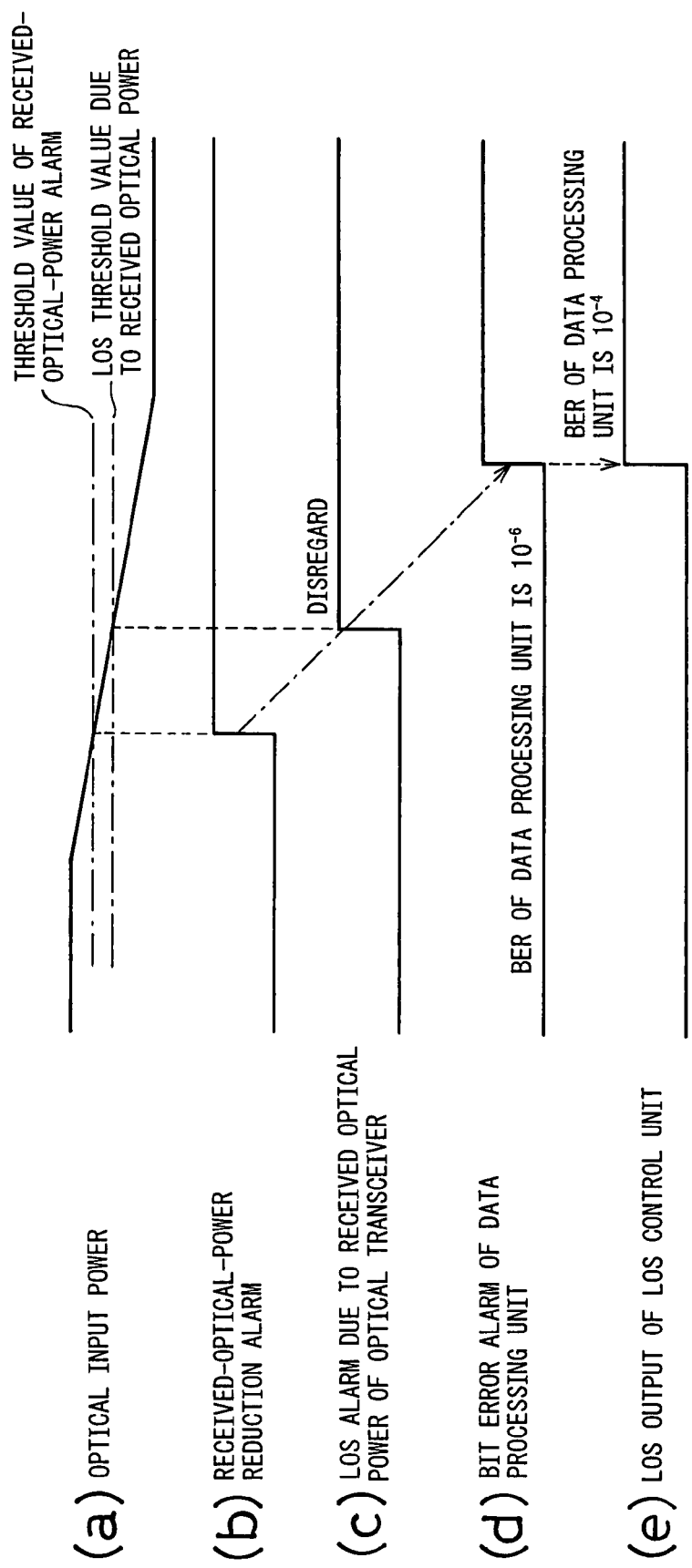

LOSS-OF-SIGNAL DETECTING DEVICE

CROSS-REFERENCE TO RELATED APPLICATION

This application is a continuation application and is based upon PCT/JP2005/1850, filed on Feb. 8, 2005.

TECHNICAL FIELD

The present invention relates to an optical transmitting device, and relates particularly to a loss-of-signal detecting device that detects a loss of signal of an optical signal received by a terminal station and a relay station, in a synchronous optical communication network, such as a SDH (Synchronous Digital Hierarchy) and a SONET (Synchronous Optical Network).

BACKGROUND ART

A terminal station and relay station within a synchronous optical communication network include a device that detects an abnormality, such as a loss of signal, by monitoring the input level of an optical signal received from an opposite station or by calculating the error rate of received data. When an abnormality, such as an LOS (Loss of Signal) is detected, the terminal station and the relay station change over a communication line from a work system to a protection system to maintain a normal communication state, and output an alarm to an operator terminal within the station and to the next-stage terminal station.

FIG. 1 shows one configuration example of a conventional loss-of-signal detecting device in an optical transmitting device.

In FIG. 1, an optical signal transmitted from the opposite station is input to an optical transceiver 1 of the same station. Data obtained by O/E (Optical/Electrical) conversion is input to a CDR (Clock & Data Recovery) unit 2.

The optical transceiver 1 includes an optical-output constant control unit or the like (not shown). Upon detecting a signal equal to or smaller than a predetermined optical input level using an optical AGC control signal or the like, the optical transceiver 1 outputs a loss-of-signal (LOS) alarm corresponding to a severe fault (SF: Signal Failure) to a data processing unit 3.

The clock and data recovery unit 2 extracts a clock component contained in the input data signal, reproduces a received clock, and samples the input data using the extracted clock, thereby reproducing the data received from the opposite station. The data and clock reproduced by the clock and data recovery unit 2 are output to the data processing unit 3.

The data processing unit 3 decodes the received data to restore the data of the transmission origin. In this case, the data processing unit 3 calculates the bit error rate (BER) of received data, and determines the degradation level of the communication line. When the BER becomes equal to or higher than a predetermined value, the data processing unit 3 determines that a signal degradation (SD) corresponding to a milder fault than the SF occurs, and records this information.

Upon detecting a LOS alarm, the data processing unit 3 sequentially outputs data of continuous data values "0" to the next stage, to execute a change over from a work system to a protection system and to carry out the alarm process of line abnormality.

FIG. 2 shows another configuration example of a conventional loss-of-signal detecting device.

In the present example, in place of the LOS alarm from the optical transceiver 1 shown in FIG. 1, a loss-of-lock (LOL) alarm showing an asynchronous (self run) state output from a PLL (Phase Locked Loop) circuit or the like inside the clock and data recovery unit 2 is output to the data processing unit 3, by relating this alarm to the signal failure (SF). Other configurations are similar to those shown in FIG. 1. In the present example, a commercially available CDR device that satisfies the common specification of the MSA (Multi Source Agreement) as a private entity related to the SDH is used in the clock and data recovery unit 2.

In the present example, upon detecting the LOL alarm, the data processing unit 3 sequentially outputs data of continuous data values "0" to the next stage, to execute a change over from a work system to a protection system and to carry out the alarm process of line abnormality (see Patent Document 2).

(Patent Document 1) Japanese Patent Application Laid-open Publication No. 2001-339347

(Patent Document 2) Japanese Patent Application Laid-open Publication No. H7-95156

According to the conventional configuration shown in FIG. 1, the optical transceiver 1 outputs an LOS alarm based on the received optical level, regardless of a signal error (BER) calculated by the data processing unit 3. Therefore, there is a risk that faults may not be detected in the order of a mild fault SD and a serious fault SF. Usually, the LOS and SF in FIG. 1 are set to an equivalent fault level, and the SD is set to about BER IE-6($10^{-6}$), and the LOS (SF) is set to about BER IE-4($10^{-4}$).

As a result, there is a risk that a moderate fault of the SD in which the current system can continuously operate may be detected as a serious line fault SF. While maintenance staff of the station and vendors analyze the BER in the process up to the occurrence of the fault or at the time of the occurrence of the fault to search the cause of the fault, the staff and vendors cannot analyze the cause of the fault, and thus the fault monitoring using the BER does not operate effectively.

The conventional configuration shown in FIG. 2 utilizes the fact that a commercial CDR device 2 outputs the LOL (LOS of Look) alarm in the serious fault (SF) of about BER IE-4. However, the detection speed of the LOL, that is, the time from the occurrence of a loss of signal until the detection of an asynchronism cannot satisfy the SF detection time within the 100 μS prescribed by the specification GR-253 due to a constraint of the circuit configuration of a PLL and the like.

Therefore, in the Prior Art by utilizing the fact that the conventional optical transceiver 1 outputs a continuous signal of a data value "0" when an optical input level becomes equal to or lower than a predetermined level, the clock and data recovery unit 2 outputs the LOL alarm immediately after detecting this output of the continuous signal.

However, the optical transceiver 1 in recent years incorporates an amplifier relevant to the optical output constant control in order, to improve reception sensitivity and expand reception range. Therefore, even when the optical signal includes a small amount of noise level, the optical transceiver 1 outputs data containing amplified noise. Consequently, the clock and data recovery unit 2 at the next stage cannot use the above conventional method (detection of continuous zero).

DISCLOSURE OF INVENTION

In light of the above problems, it is an object of the present invention to provide a loss-of-signal detecting device that monitors an input level of a received optical signal, immediately detects a serious fault (SF) when the optical input level is equal to or above a predetermined level, and prioritizes a detection of a mild fault (SD) when the optical input level is lower than the predetermined level, and thereafter permits detection of a serious fault (SF), thereby achieving both detection of the SF at an early stage based on the optical input level and securing of a detection sequence from the SD to the SF.

The present invention provides a loss-of-signal detecting device including: an optical input unit that outputs received-optical-power reduction information and an LOS alarm based on a measuring of received optical power of an optical input signal; a synchronizing unit that extracts a synchronous clock contained in the optical input signal, and outputs an LOL alarm when the clock is asynchronous; and a loss-of-signal detecting unit that determines the presence or absence of the received-optical-power reduction information, sets the LOS alarm valid based on the output of the LOL alarm when the received-optical-power reduction information is present, and immediately regards the LOS alarm as valid and detects a loss of signal based on the valid LOS alarm when the received-optical-power reduction information is absent.

When received-optical-power reduction information is present, the loss-of-signal detecting unit regards the output of the LOL alarm as a valid LOS alarm. The loss-of-signal detecting device further includes a BER measuring unit that measures a BER of received data reproduced by using a synchronous clock, and determines that the received data is in a fault state of an SD level when the received data is equal to or higher than a predetermined BER value.

The BER value in the fault state of the SD level is smaller than the BER value in the fault state of the LOS level or the LOL level. The BER value in the fault state of the LOS level or the LOL level is substantially equivalent to the BER value in the fault state of the SF level. Received-optical-power reduction information is output either in a predetermined cycle or after a lapse of a predetermined delay at the time of obtaining the information.

According to the present invention, in the reception state of a sufficiently large optical input level (absence of received-optical-power reduction information), a loss of signal is detected only when a serious fault (SF) is found due to device trouble or a line disconnection. Therefore, in this case, the LOS is detected immediately, and the SF detection time within the 100 μS of the specification GR-253 is satisfied.

On the other hand, in a state where the optical input level decreases to a minimum reception level or below (presence of received-optical-power reduction information), an optical reception level from the opposite station is usually sufficiently larger than the minimum reception level of the receiving station. Therefore, it can be assumed that a loss of signal gradually occurs due to the aging of devices within the station or the transmission line between the stations or a change in environmental temperature. Accordingly, in a state in which the optical input signal level decreases, a BER is measured during continuous operation of the system, to detect a mild fault (SD; BER IE-6) in which the system can be operated continuously. A more serious fault (LOL; BER IE-4) is detected conditional to the SD detection (after SD detection).

As a result, a detailed fault analysis leading up to a serious fault can be carried out using a fault monitoring function according to the BER, and maintenance of the station and total system becomes substantially easier. Based on the above-described operation, the above conventional method (continuous zero detection) is no longer necessary in the present invention. An efficient device design can be carried out at low cost using a commercially available CDR device.

BRIEF DESCRIPTION OF DRAWINGS

FIG. 6 shows one example (1) of a timechart of the operation shown in FIG. 3;

FIG. 7 shows one example (2) of a timechart of the operation shown in FIG. 3;

FIG. 8 shows a loss-of-signal detecting device according to a second embodiment of the present invention;

FIG. 9 shows one example (1) of a timechart of the operation shown in FIG. 8; and FIG. 10 shows one example (2) of a timechart of the operation shown in FIG. 8.

BEST MODES FOR CARRYING OUT THE INVENTION

Figure 3:
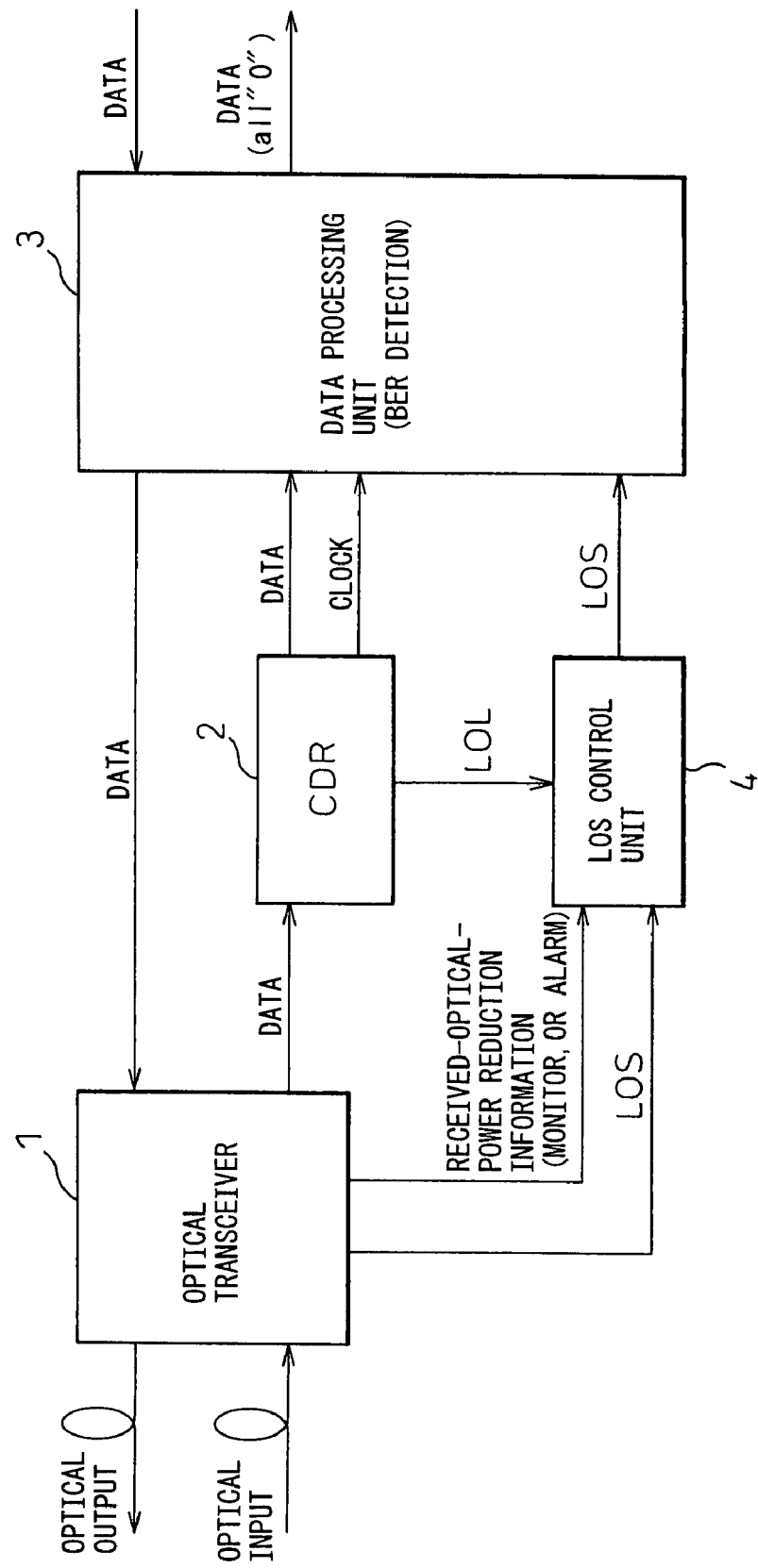
FIG. 3 shows a loss-of-signal detecting device according to a first embodiment of the present invention.

FIG. 3 shows a loss-of-signal detecting device according to a first embodiment of the present invention.

In FIG. 3, the optical transceiver 1, the clock and data recovery (CDR) unit 2, and the data processing unit 3 are similar to those of the conventional example. Therefore, these units are not explained hereafter. Based on the MSA of optical transceivers, recent optical transceivers include both or either one of various monitoring functions and detecting functions of optical output power, internal temperature, and power source voltage. In the present invention, a monitoring function of received optical power or an alarm function of received optical power is used to detect a LOS.

Figure 1:
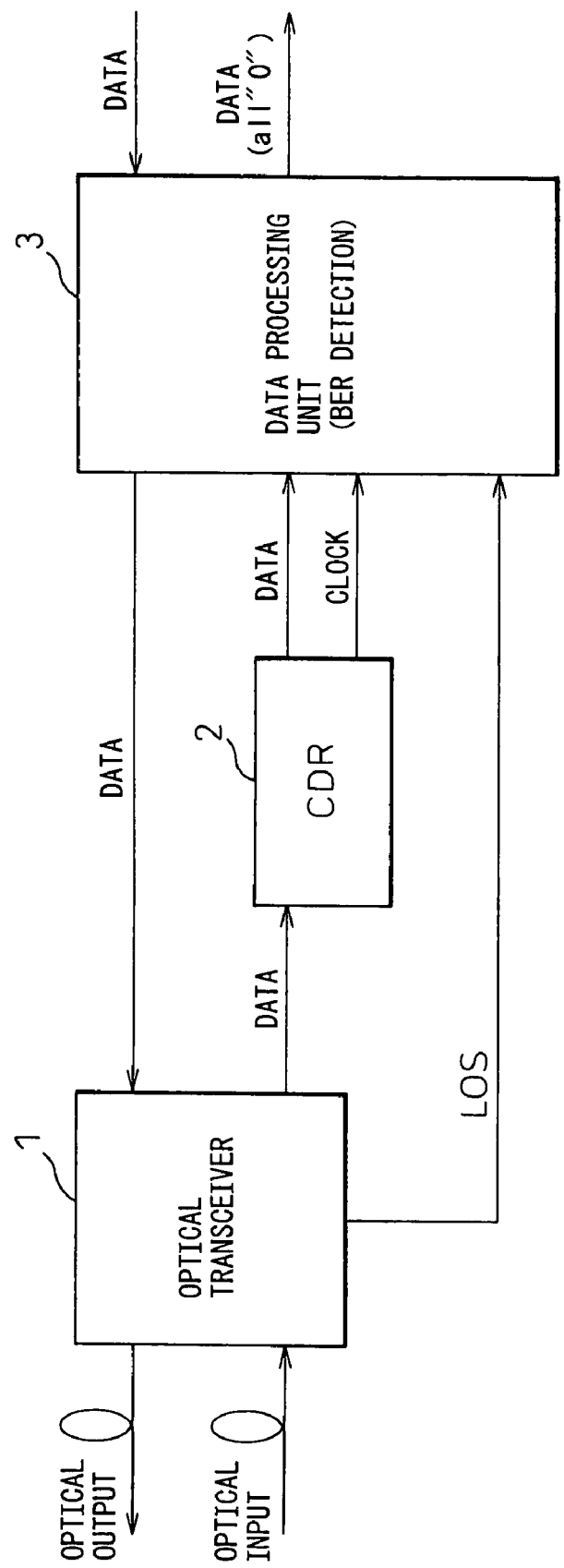
FIG. 1 shows one configuration example of a conventional loss-of-signal detecting device.

A LOS control unit 4 additionally provided in the present embodiment receives received-optical-power reduction information and a LOS alarm from the optical transceiver 1, and an LOL alarm from the clock and data recovery unit 2. The LOS control unit 4 controls passage of the LOS alarm from the optical transceiver 1 to the data processing unit 3, based on the received-optical-power reduction information and the LOL alarm. When the LOS alarm is received, the data processing unit 3 executes a process similar to that of the conventional example shown in FIG. 1.

Figure 2:
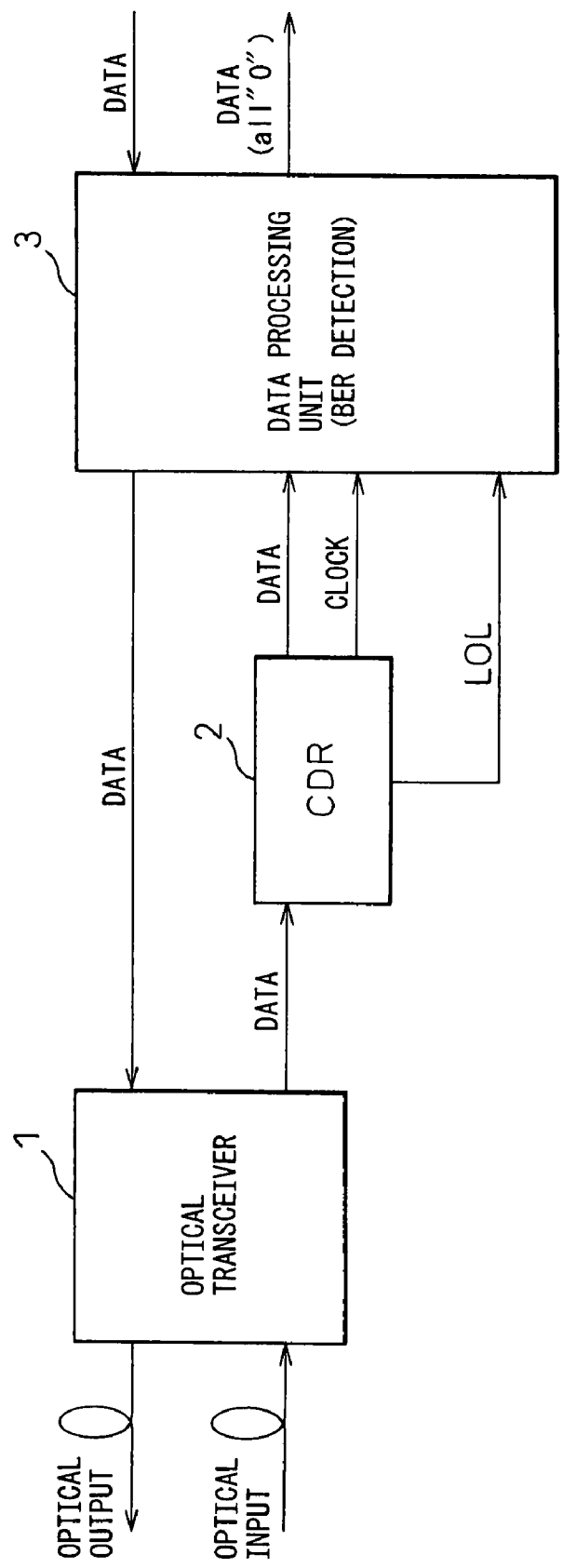
FIG. 2 shows another configuration example of a conventional loss-of-signal detecting device.

The LOS control unit 4 can also output one of the LOS alarm from the optical transceiver 1 and the LOL alarm from the clock and data recovery unit 2, both showing a serious fault (BER IE-4), based on the received-optical-power reduction information from the optical transceiver 1 (see FIG. 5 described later). When the LOL alarm is received, the data processing unit 3 executes a process similar to that of the conventional example shown in FIG. 2.

Figure 4:
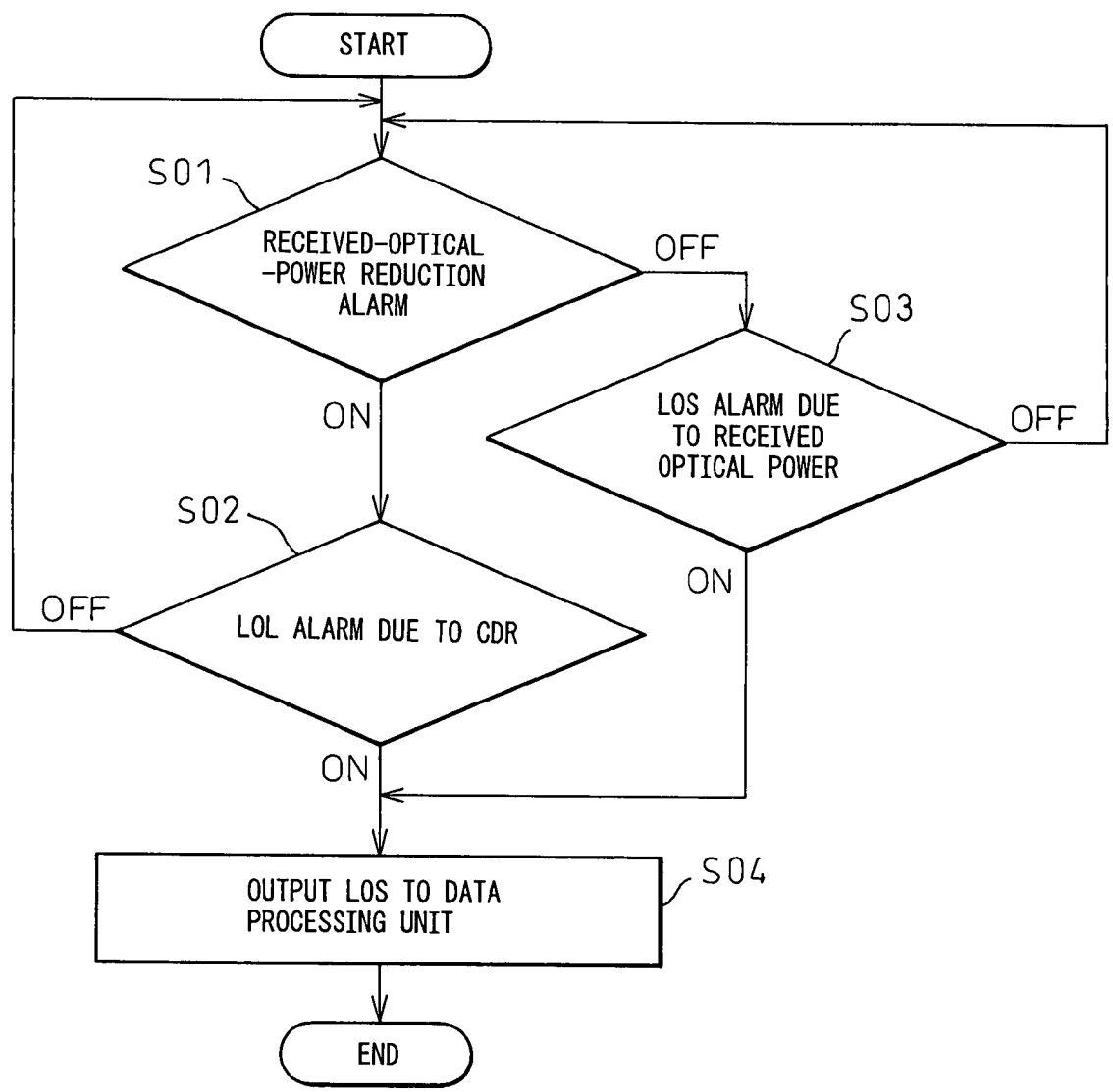
FIG. 4 shows one example of a control flow of a LOS control unit.

FIG. 4 shows one example of a control flow of the LOS control unit 4.

In the present example, the LOS control unit 4 monitors received-optical-power reduction information (a received-optical-power reduction alarm, in the present example) from the optical transceiver, and determines the presence or absence of this information (S01). The received-optical-power reduction alarm is output when a received-optical-power value or its average value measured at each predetermined cycle becomes equal to or smaller than a minimum received-optical-power guaranteed value.

When a received-optical-power reduction alarm is not detected (OFF), the LOS control unit 4 monitors a LOS alarm from the optical transceiver 1, and determines the presence or absence of the LOS alarm (S03). Upon detecting the LOS alarm (ON), the LOS control unit 4 outputs the LOS alarm to the data processing unit 3 (S04). On the other hand, when a LOS alarm is not detected (OFF), the LOS control unit 4 returns to monitoring of a received-optical-power reduction alarm (S01).

As explained above, in a state of not detecting a received-optical-power reduction alarm (that is, the received optical power is equal to or larger than a minimum received-optical-power-value), the LOS control unit 4 directly outputs the input LOS alarm to the information processing unit 3, thereby satisfying a prescribed value of 100 µS.

On the other hand, when a received-optical-power reduction alarm is detected (ON), the LOS control unit 4 monitors an LOL alarm from the clock and data recovery unit 2, and determines the presence or absence of an LOL alarm (S02). Upon detecting an LOL alarm (ON), the LOS control unit 4 passes the LOS alarm input from the optical transceiver 1, and inputs the LOS alarm to the information processing unit 3 (S04). When an LOL alarm is not detected (OFF), the LOS control unit 4 returns to monitoring of a received-optical-power reduction alarm (S01).

As explained above, in a state of detecting a received-optical-power reduction alarm (that is, the received optical power is smaller than a minimum received-optical-power value), the LOS control unit 4 outputs the LOS alarm, input conditional to the detection of an LOL alarm from the clock and data recovery unit 2 (that is, after detecting the LOL), to the information processing unit 3. Accordingly, the sequence of the occurrence of the SD and the LOS is maintained.

Figure 5:
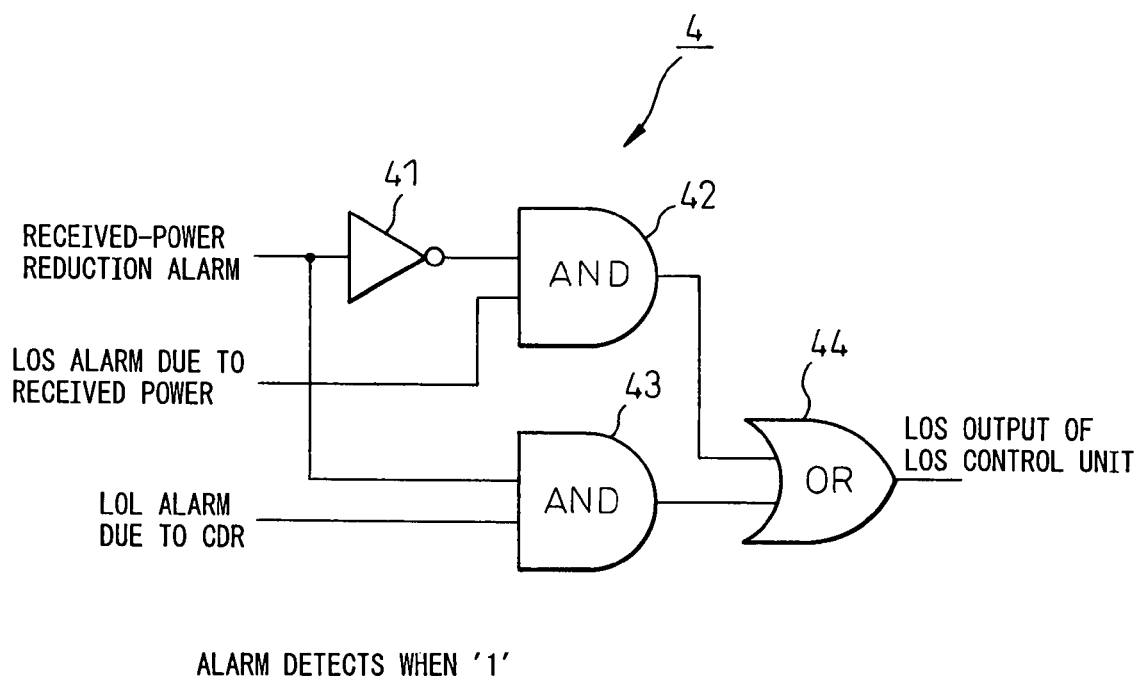
FIG. 5 shows one example of a detailed circuit configuration of a LOS control unit.

FIG. 5 shows one example of a detailed circuit configuration of the LOS control unit.

In FIG. 5, a received-optical-power reduction alarm from the optical transceiver 1 is input to an inverter 41 of the LOS control unit 4. The output of the inverter 41 and the LOS alarm from the optical transceiver 1 are input to a next-stage AND circuit 42. Therefore, when a received-optical-power reduction alarm is not detected (a value "0"), the AND circuit 42 directly passes the LOS alarm from the optical transceiver 1. On the other hand, when a received-optical-power reduction alarm is detected (a value "1"), the AND circuit 42 prohibits the LOS alarm from the optical transceiver from passing.

A received-optical-power reduction alarm from the optical transceiver 1 is input to one of the inputs to the AND circuit 43, and LOL alarm from the clock and data recovery unit 2 is input to the other input. Therefore, when a received-optical-power reduction alarm is not detected (the value "0"), the AND circuit 43 prohibits the LOL alarm from the clock and data recovery unit 2 from passing. On the other hand, when a received-optical-power reduction alarm is detected (the value "1"), the AND circuit 43 directly passes the LOL alarm from the clock and data recovery unit 2.

As a result, an OR circuit 44 at the output stage outputs one of the LOS alarm from the optical transceiver 1 and the LOL alarm from the clock and data recovery unit 2, based on the presence or absence of a received-optical-power reduction alarm. In the present example, because the fault level of the LOS and the LOL is equal to a fault level of the SF (BER IE-4), the output alarm is displayed as an LOS alarm in the drawing.

In the present example, received optical power is monitored based on a received-optical-power reduction alarm from the optical transceiver 1 (or a monitoring signal of a received optical level). When the received optical power is equal to or higher than the minimum value of the received optical power guaranteed by the optical transmitting device, monitoring of the LOS based on the received optical power of the optical transceiver 1 is made valid. When the received optical power is smaller than the minimum value of the received optical power, the LOS alarm based on the received optical power is made invalid, and the LOL alarm from the clock and data recovery unit 2 is monitored.

As a result, within the range of the received optical power guaranteed by the optical transmitting device, a LOS can be detected within 100 µS from the loss of a signal. When the received optical power becomes equal to or smaller than a guarantee value, a LOS is regarded as having been detected by the LOL alarm output after the SD detection using the BER. With this arrangement, the sequence of the occurrence of a fault from the SD to the LOS can be maintained.

FIGS. 6 and 7 show one example of a timechart of the operation of the loss-of-signal detecting device according to the present invention. FIG. 6 shows one example when the received optical power is larger than the minimum received-optical-power value guaranteed by the loss-of-signal detecting device. FIG. 7 shows one example when the received optical power is smaller than the minimum received-optical-power value guaranteed by the loss-of-signal detecting device.

FIG. 6 shows one operation example when a serious fault (SF) suddenly occurs due to disconnection of a fiber cable in which an optical signal of received optical power is sufficiently larger than the minimum received optical power is being input as shown by (a) in FIG. 6, and optical input power becomes zero. In this case, the received-optical-power reduction alarm output from the optical transceiver 1 is output based on a comparison between the received-optical-power values measured in each cycle of a few mS to a few +mS or their average value and a minimum received-optical-power value (see a threshold value of the received-optical-power alarm shown by (a) in FIG. 7). Therefore, the output is delayed from the loss of a signal in the order of mS in the predetermined cycle ((b) in FIG. 6). The LOS control unit 4 determines that an optical signal of a received optical power larger than the minimum received optical power is being input until when the received-optical-power reduction alarm is output. By adding a capacitance element to the output line of the received-optical-power reduction alarm (the input of 41 in FIG. 4), output can be delayed by about one ms, and the LOS alarm is securely output by detecting a momentary variation of the received power as shown by (a) in FIG. 6 during this period (see 42 in FIG. 5).

On the other hand, the LOS alarm output from the optical transceiver 1 is detected by a simple comparison of the optical input power with the LOS threshold value of the received optical power (see (a) in FIG. 7). Therefore, the LOS alarm is output at substantially the same time as when loss of a signal occurs as shown by (c) in FIG. 6. In the present example, the LOL alarm from the clock and data recovery unit 2 shown by (d) in FIG. 6 is disregarded.

In the present example in which the received optical power is larger than the minimum received optical power, the LOS alarm from the optical transceiver 1 directly passes the LOS control unit 4 and is output to the data processing unit 3, as shown by (e) in FIG. 6. The data processing unit 3 receives this LOS alarm, and immediately starts the alarm process. Therefore, as shown in the drawing, when an LOS alarm is used, 100 µS as prescribed by the SF detection time (T) can be sufficiently satisfied.

FIG. 7 shows one operation example when the optical input power gradually decreases due to the aging of the devices between the stations and the transmission line and due to changes in environmental temperatures ((a) in FIG. 7), and optical input power becomes smaller than the threshold value of the received-optical-power alarm and the LOS threshold value of the received optical power. In this case, the optical input signal of received optical power that is larger than the threshold value of the received-optical-power alarm can be received error free. The optical input signal of a received optical power smaller than the LOS threshold value of the received optical power cannot be received. The optical input signal having received optical power between the threshold value of the received-optical-power alarm and the LOS threshold value of the received optical power can be received at the BER level (SD) at which the current system can be operated continuously.

In the present example, the optical signal having an intermediate received optical power between the threshold value of the received-optical-power alarm and the LOS threshold value of the received optical power at the operation starting time is the target. Therefore, a serious fault (SF), which does not require a consideration of intermediate received optical power from the beginning due to a line disconnection or the like as shown in FIG. 6 is excluded from the target of the present example.

As shown by (b) in FIG. 7, the received-optical-power reduction alarm is output when the received optical power of the optical input signal becomes smaller than the threshold value of the received-optical-power alarm. The LOS control unit 4 disregards the LOS alarm from the optical transceiver 1 during a period from when the received-optical-power reduction alarm is detected until when at least the LOL alarm from the clock and data recovery unit 2 is detected (see (b) to (d) in FIG. 7).

During this period, the optical transceiver 1 outputs the LOS alarm when the received optical power of the optical input signal becomes lower than the LOS threshold value of the received optical power ((c) in FIG. 7). The data processing unit 3 repeatedly calculates the BER, determines that the reception state is at the SD level when the BER becomes IE-6, and records this information. The LOS control unit 4 detects the LOL alarm from the clock and data recovery unit 2, when the BER is near IE-4 ((d) in FIG. 7).

Accordingly, the LOS control unit 4 outputs the LOS alarm from the optical transceiver 1 present at the time of detecting the LOL alarm or the detected LOL alarm as the LOS alarm, to the data processing unit 3 ((e) in FIG. 7). Upon receiving this LOS alarm, the data processing unit 3 starts a serious fault process (SF). As described above, according to the present example, the sequence of the occurrence of the SD and the SF can be securely guaranteed, in a state in which the received-optical-power reduction alarm is being output.

FIGS. 8 to 10 show a loss-of-signal detecting device according to a second embodiment of the present invention.

The second embodiment shown in FIG. 8 is different from the first embodiment shown in FIG. 3 as follows. In FIG. 3, the LOL alarm output from the PLL circuit of the clock and data recovery unit 2 is output to the LOS control unit 4. On the other hand, in the second embodiment, the data processing unit 3 obtains the BER level IE-4 corresponding to the LOL alarm by software calculation like the SD, and outputs the obtained BER level IE-4 to the LOS control unit 4 as a bit error alarm in place of the LOL alarm. Other operations are similar to those of the first embodiment.

Therefore, in FIG. 9 and FIG. 10 showing operation examples of the second embodiment, (d) in FIG. 9 is changed to the bit error alarm of the data processing unit, and (d) in FIG. 10 is changed to the bit error alarm of the data processing unit. Other operations are similar to those shown in FIGS. 6 and 7 of the first embodiment. Operations in the second embodiment similar to those in the first embodiment are not explained in order to avoid redundant explanation.

As explained above, according to the present invention, when the optical input power is equal to or higher than the minimum reception level, loss of a signal (LOS) is generated immediately. When the optical input power is smaller than the minimum reception level, the SD and the LOS can occur in this sequence.

The invention claimed is:

1. A loss-of-signal detecting device comprising:
an optical input unit that outputs received-optical-power reduction information and an LOS alarm based on a measuring of received optical power of an optical input signal;
a synchronizing unit that extracts a synchronous clock contained in the optical input signal, and outputs an LOL alarm when the clock is asynchronous; and
a loss-of-signal detecting unit that determines the presence or absence of the received-optical-power reduction information, sets the LOS alarm valid based on the output of the LOL alarm when the received-optical-power reduction information is present, and immediately sets the LOS alarm valid and detects a loss of signal based on the valid LOS alarm when the received-optical-power reduction information is absent.

2. The loss-of-signal detecting device according to claim 1, wherein
when the received-optical-power reduction information is present, the loss-of-signal detecting unit regards the output of the LOL alarm as a valid LOS alarm, in place of setting the LOS alarm valid based on the output of the LOL alarm.

3. The loss-of-signal detecting device according to claim 1, further comprising a BER measuring unit that measures a BER of received data reproduced by using the synchronous clock, and determines that the received data is in a fault state of an SD level when received data is equal to or higher than a predetermined BER value.

4. The loss-of-signal detecting device according to claim 3, wherein
the BER value in the fault state of an SD level is smaller than the BER value in the fault state of the LOS level or the LOL level.

5. The loss-of-signal detecting device according to claim 4, wherein
the BER value in the fault state of the LOS level or the LOL level is substantially equivalent to the BER value in the fault state of the SF level.

6. The loss-of-signal detecting device according to claim 1, wherein
the received-optical-power reduction information is output either in each predetermined cycle or after a lapse of a predetermined delay since the time of obtaining the information.

7. An optical transmitting device comprising:
an optical transceiver including an optical input unit that transmits and receives an optical signal, measures received optical power of an optical input signal, outputs received-optical-power reduction information when the measured received optical power becomes equal to or smaller than a first threshold value, and outputs an LOS alarm when the measured received optical power becomes equal to or smaller than a second threshold value;

a clock and data recovery unit including an synchronizing unit that synchronously reproduces received data contained in the optical input signal, extracts a synchronous clock contained in the optical input signal, and outputs an LOL alarm when the clock is asynchronous;

a LOS control unit that determines presence or absence of the received-optical-power reduction information, sets the LOS alarm valid based on an output of the LOL alarm or regards the LOL alarm as a valid LOS alarm when the received-optical-power reduction information is present, and immediately sets the LOS alarm valid when the received-optical-power reduction information is absent; and a data processing unit including a BER measuring unit that processes the received data, measures a BER of received data recovered using the synchronous clock, determines that an SD level is in a fault state and records the fault state when the measured BER is equal to or larger than a predetermined BER value, and that executes a loss-of-signal fault process based on the valid LOS alarm.

8. An optical transmitting device comprising:

an optical transceiver including an optical input unit that transmits and receives an optical signal, measures received optical power of an optical input signal, outputs received-optical-power reduction information when the measured received optical power becomes equal to or smaller than a first threshold value, and outputs an LOS alarm when the measured received optical power becomes equal to or smaller than a second threshold value;

a LOS control unit that determines presence or absence of the received-optical-power reduction information, sets the LOS alarm valid based on an output of a bit error alarm when the received-optical-power reduction information is present, and immediately sets the LOS alarm valid when the received-optical-power reduction information is absent; and a data processing unit that processes received data contained in the optical signal, measures a BER of the received data, determines that an SD level is in a fault state and records the fault state when the measured BER is in between a first BER value and a second BER value larger than the first BER value, outputs the bit error alarm when the BER is equal to or larger than the second BER value, and executes a loss-of-signal fault process based on the valid LOS alarm.

* * * * *